J. COLE, Jr.
APPARATUS FOR THE SEPARATION OF PETROLEUM PRODUCTS.
No. 182,169. Patented Sept. 12, 1876.
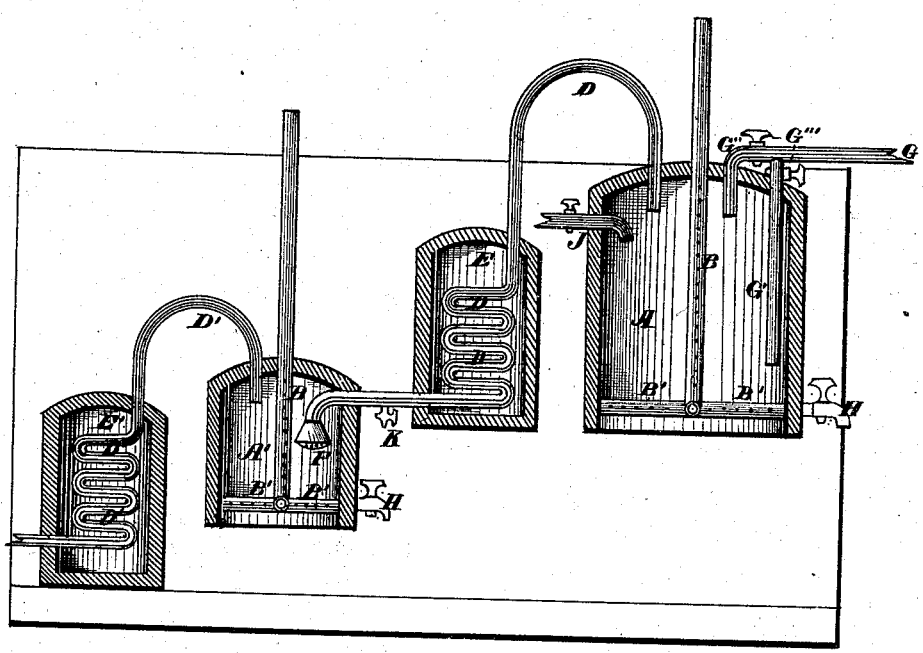

UNITED STATES PATENT OFFICE.

JAMES COLE, JR., OF CLEVELAND, OHIO.

IMPROVEMENT IN APPARATUS FOR THE SEPARATION OF PETROLEUM PRODUCTS.

Specification forming part of Letters Patent No. 182,169, dated September 12, 1876; application filed April 15, 1876.

*To all whom it may concern:*

Be it known that I, JAMES COLE, Jr., of Cleveland, in the county of Cuyahoga and State of Ohio, have invented certain new and useful Improvements in Apparatus for Separation of Petroleum Products; and I do hereby declare the following to be a full, clear, and exact description of the invention, such as will enable others skilled in the art to which it pertains to make and use it, reference being had to the accompanying drawings, which form part of this specification.

My invention relates to an improved apparatus for employment in the manufacture of the various fluid products of crude petroleum.

My invention relates more particularly to apparatus for effecting a perfect separation of crude petroleum or any one of its distillates into its various distillates, whereby each may be separately collected, the operation being continuous, and without waste of any of said products, the process being carried on with perfect safety.

My invention consists in the novel process and apparatus for the separation of petroleum products, as hereinafter specified and claimed.

In the drawings is presented a sectional view of a series of stills illustrating my invention.

Suppose crude petroleum or any one of its distillates to be the liquid that is contained in the first still, and which it is desired to separate by distillation into its various distillates—

A is the first still, $A^1 A^2$, &c., the successive stills. B are pipes, through which steam may be conducted to heat the said liquid in the stills; B' are the separate branches of the pipe, whereby the said heat may be dispensed at various parts of the still simultaneously. They may or may not be perforated. If perforated, as is the preferable method, the free steam will be permitted to bubble through the oil, and what is not condensed or passed over will remain in the body of the still. D D' are pipes leading over from one still through a condenser, E E', into the next succeeding still. F is a rose or its equivalent, whereby the liquid passed through the corresponding pipe will fall as spray into the still. G is a pipe, through which a blast of air may be forced into the still A, and a similar pipe may, if desired, be connected with any of the other stills, though, generally, one, as shown, will answer every purpose. If passed down, as at $G^1$, the air passes up through the liquid. If passed through the conduit $G^2$, it enters the still above the liquid, and the direction it is to take may be governed by suitable stop-cocks $G^2$ and $G^3$. The stills A $A^1$, &c., are all closed, so that the products of distillation can escape at no point, except they be voluntarily permitted to escape, as, for instance, at the last still of the series, when it is no longer practicable or desirable to effect a condensation to the form of a liquid.

I do not limit myself to the employment of heat in every still of the series, for it is apparent that I may only employ heat in the first still, and then, by increasing the condensing power of each of the succeeding condensers, I would be enabled to procure in the one operation a separation of the products of distillation into distillates possessing various but successively higher specific gravities. Of course the separation would not be so perfect as it would be if the steam-heat was applied to each still to volatilize and carry over any of the more volatile products that might have condensed and fallen with the heavier grades. So, also, instead of forcing a blast of air through the pipes G, steam may be forced through instead, and if steam was thus employed there would be no necessity for a vent at the last still, as the steam would be rapidly condensed, and yet serve the same purpose of carrying over the volatilized and uncondensed products. Whereas, if air-blast is employed, it would be necessary to provide an escape-vent at the last still, with a waste of some of the lighter products, which would be carried out with the blast.

The operation of the device is as follows: The still A being charged with the liquid, such as petroleum or any one of its distillates, or the residual product left after a partial distillation of petroleum, steam is passed through the pipes B B', which we will suppose to be perforated, as shown. As the liquid warms, the lighter and more volatile products will be volatilized and passed over, the very lightest passing over with a very moderate heat, and, as the heat is increased, the heavier and more condensable products successively vaporize and pass over. If steam or air blast through the pipe G is employed, these volatilized products, as soon as they separate from the liquid, are instantly caught up and carried out of the still. As these products pass forward through the pipe D, the heaviest of them are condensed in the condenser E, and fall as a liquid into the second still, while the lighter portions pass on through the pipes D′, &c. That which falls into the still $A^1$ may pass through a rose, F, so as to drop in form of spray through an atmosphere which has been sufficiently heated to vaporize and drive out all except the very heaviest of the liquid product, which will remain in the still $A^1$. The volatilized products continue on forward through the pipe D′ and the condenser E′ of more power than the first, and here the next heaviest grade is condensed and falls in like manner, preferably through a rose into the third still, where a still lighter heat is applied, or may be, leaving a certain grade of liquid, and passing the vaporized or lighter products still further forward, and so on. The result is that in the still $A^1$ is left a heavy oil suitable for burning-fluid, and for other purposes where the liquid is required to stand a high-fire test, being entirely devoid of those very light and highly volatile and inflammable products that will vaporize and cause explosion when a very slight heat is applied.

In the still $A^1$ is a lighter oil of higher gravity, of lower fire-test, but still devoid of the lighter and more explosive and more highly volatile products. The still $A^2$ contains a still lighter products of still higher gravity, and so on, as far as the process is carried.

It is apparent that, by carefully grading the successive degrees of heat in the successive stills, this process may be carried to any extent desired, and the original oil may be separated into a large number of slightly different grades; or, in the same set of stills, any one of the grades that has been collected as above may be treated in like manner, and be separated into separate and distinct grades.

By the employment of suitable faucets H the products remaining in the several stills may be drawn off as collected, and by a feed-pipe, J, the still A may be supplied with fresh liquid as rapidly as distilled, and thus the process may be made continuous, and all the different grades may be produced and collected simultaneously, and by a single operation, thus effecting a large saving of expense for fuel and labor, and avoiding entirely the usual waste in producing the separate grades.

Faucets K may be located at suitable points for drawing off and testing the products at any point.

It is understood that I do not limit myself to any particular means for heating the said liquid in the stills. Any means may be employed for that purpose. A furnace may be used beneath the still, or hot air may be employed, either free or confined in pipes; but I prefer, as stated herein, to employ steam-heat, and in applying the said heat I prefer to carry the steam through pipes that are passed into the still and through the liquid, and I prefer also to employ perforated pipes, so that the steam may pass freely into and bubble through the oil or liquid in the tank.

By the process herein described I produce, in the first still A, a liquid, which has separated from it all of the volatile and highly-inflammable products, leaving a fluid highly adapted as a burning-fluid, being capable of withstanding a higher fire test than any petroleum burning-fluid I have ever before known, as it will be seen that the blast carries out all the light volatilized matter the instant that it is raised by the heat, leaving none of it behind to condense and fall back into the liquid in the said still A.

What I claim is—

1. The combination, with a still provided with a vapor-outlet, of perforated steam-pipes for applying heat to the contained liquid, and an independent blast-pipe for introducing within the still a current of air or steam, substantially as and for the purpose described.

2. The combination, with a still provided with perforated steam-pipes for applying heat to the contained liquid, and an independent blast-pipe for introducing within the still a blast of air or steam, of one or more succeeding stills $A\ A^1$, each still connected with the preceding still by a pipe, D, &c., passing through a condenser, E, &c., substantially as and for the purpose described.

3. Two or more stills, $A\ A^1$, &c., each provided with perforated pipes for admitting steam-heat at or near the bottom, each still connected with the preceding still by a pipe passing through an intermediate condenser, said first still provided with an independent blast-pipe for admitting within the series of stills a current of air or steam, the whole constituting a means for separating the liquid products of petroleum or other oil, all combined substantially as described.

In testimony whereof I have signed my name to this specification in the presence of two subscribing witnesses.

JAMES COLE, JR.

Witnesses:
FRANCIS TOUMEY,
EDWARD WALSH.